Jan. 5, 1965

A. J. TIMPER 3,164,489

SILICON IMPREGNATED GRAPHITE PART
AND PROCESS FOR PRODUCING SAME

Filed Dec. 26, 1961

INVENTOR.
ARTHUR J. TIMPER
BY
William N Patrick
ATTORNEY 3,164,489
SILICON IMPREGNATED GRAPHITE PART AND
PROCESS FOR PRODUCING SAME
Arthur J. Timper, Torrance, Calif., assignor, by mesne assignments, to Lear Siegler Inc., Santa Monica, Calif., a corporation of Delaware
Filed Dec. 26, 1961, Ser. No. 161,971
10 Claims. (Cl. 117—212)

This invention relates to a treated graphite part. More particularly, this invention relates to an impregnated graphite part and to a process for producing it.

The method of impregnating graphite is well known in the art. For example, it is known that molten silicon will react with graphite or carbon forming silicon carbide. However, a process has not been developed which would produce an impregnated graphite part which would be impervious to molten silicon. It is found, for instance, that if an excess of molten silicon is placed in contact with a work piece of graphite, say, a plate or crucible of graphite of given dimensions, the molten silicon will penetrate through the plate at the temperature of the molten silicon and cause the plate of graphite to rupture. This, of course, makes it impossible to make a graphite crucible for holding molten silicon which would be heated by the passage of an electric current therethrough.

It is, therefore, an object of this invention to provide an impregnated graphite article. Another object of this invention is to provide an improved process for impregnating graphite. Still another object is to provide a graphite crucible for holding molten silicon. It is likewise an object of this invention to provide a silicon-impregnated graphite crucible for holding molten silicon. It is also an object to provide a graphite crucible having a silicon-impregnated surface which is substantially impervious to molten silicon. Still another object is to provide a support for vacuum deposition of silicon.

The above and other objects of this invention will become more apparent from the discussion which follows in conjunction with the accompanying drawings in which.

Figures 1, 2:
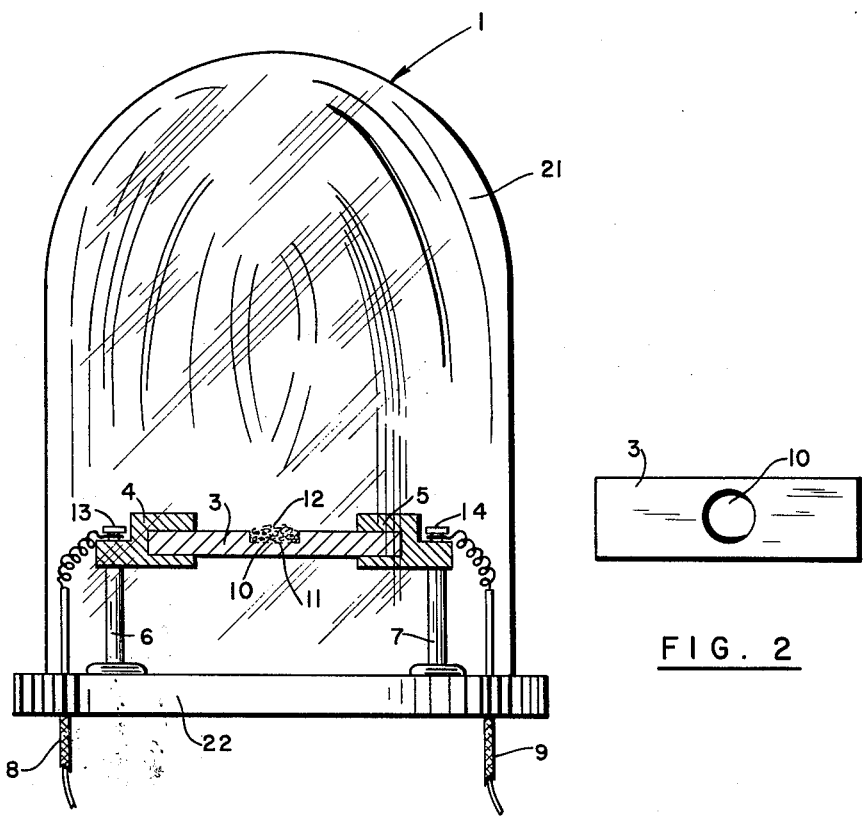
FIG. 1 shows a graphite strip to be treated in position in a treating vessel.
FIG. 2 is a top view of the graphite strip shown in FIG. 1.

In FIG. 1 there is shown in schematic form a vessel 1 having a bell jar part 21 removably mounted on a base 22. A strip of graphite 3 is held by mounting brackets 4 and 5 which are fixed to uprights 6 and 7 by means of screws or bolts 13 and 14, respectively, or by any other suitable means such as clamping, etc.

Electrical conductors 8 and 9 are joined to the brackets or clamps 4 and 5 respectively and lead to a source of current, not shown. The graphite strip 3 has a depression 10 as indicated by the dotted line 11, adapted to contain powdered or molten silicon. The upper dotted line 12 indicates the top of powdered silicon that is loaded onto the graphite strip.

FIG. 2 is a top view of the graphite strip shown in FIG. 1. Although the depression is shown to be circular, the configuration of the depression is not critical. It is only preferable that means be provided to retain molten silicon on the desired location of the graphite, the depression can be of any shape or size. Alternatively, various strips of any suitable material such as graphite, for example, can be placed either on the graphite strip or adjacent the sides thereof for the retention of the silicon. If a relatively small amount of silicon powder is to be melted at a time on the strip, so that there will be no excessive spreading of molten silicon over the surface of the graphite, no depression or retaining barriers are required.

The vessel 1 is equipped with gas inlet and outlet means and means for reducing the pressure therein, not shown in the drawing. Equivalent parts are designated by the same numeral in the different figures.

The objects of this invention are accomplished by a process for treating a graphite part comprising the steps of, (1) coating the surface with silicon; (2) heating the coated graphite part until the silicon is melted and absorbed by the graphite to form a treated graphite part with a silicon impregnated surface (3) cooling said treated part to a temperature below the melting point of silicon, and thereafter repeating steps (1), (2) and (3).

The following nonlimiting examples will serve to illustrate the process and product of this invention.

*Example I*

A strip of graphite 6 cms. x 1.5 cm. x 0.2 cm. is suitably held between leads capable of carrying sufficient current to heat the strip of graphite to about 1700° C. An amount of silicon equivalent to from about 50 to about 100 milligrams, sufficient to penetrate to a depth of about 0.1 mm. below the surface of the graphite, is placed on the graphite strip. Electric current is passed through the graphite strip and the strip heated until the silicon becomes molten. The molten silicon is observed to be absorbed by, or to react with, the graphite. The passage of current is then discontinued and the graphite allowed to cool below the melting point of silicon. An additional amount of silicon is then placed on the graphite in the same location that the previous silicon had been placed, and the heating process repeated. The process of heating successive batches of silicon on the area of graphite to be treated is repeated until substantially no additional silicon is absorbed into the graphite base, but remains as a pool of molten silicon on the surface. The silicon-impregnated graphite now acts as a vehicle for supporting molten silicon without fracturing or cracking.

A cross-section of the graphite strip after the first treatment with silicon indicates a penetration by the silicon of about 0.01 millimeter below the surface.

Cross-sections after about 5 treatments with molten silicon indicate a penetration by the silicon into the graphite to a depth of from about 0.05 to about 0.3 millimeter. Still greater penetrations are attainable; however, penetrations of from about 0.05 to about 0.3 millimeter are sufficient to provide a holder or crucible for silicon, and therefore no advantage is gained in bringing about a greater penetration of the silicon into the graphite.

*Example II*

The process of Example I is repeated at a reduced pressure of about $10^{-5}$ mm. of Hg in the apparatus shown in FIG. 1 to produce a treated graphite article which supports or holds molten silicon.

*Example III*

The process of Example II is repeated using powdered silicon and a graphite strip having a depression in it as shown in the drawings to provide a graphite article with a portion of its surface treated with silicon. The article is capable of serving as a crucible for holding molten silicon without cracking or allowing the molten silicon to run through. A cross-section of the impregnated graphite shows that the silicon penetrated to a depth of about 0.05 mm.

*Example IV*

The process of Example III is repeated with the modification that the heating of the powdered silicon is carried out in an atmosphere of argon. Cross-sectioning shows the molten silicon to have penetrated to a depth of about 0.3 mm. into the graphite.

Satisfactory molten silicon-graphite containing crucibles are also obtained when the procedure of Example IV is carried out in an atmosphere which is non-reactive towards silicon or graphite. Non-limiting examples of such atmospheres include hydrogen, and the inert gases such as argon, helium, neon, etc.

*Example V*

The process of Example III is carried out with a depression in the graphite strip 1.0 mm. in depth. The amount of powdered silicon used is 0.05 to 0.1 gram and covers an area of 1.0 sq. cm. Substantially the same amount of powdered silicon is used in 6 successive heatings. On the 6th heating a pool of molten silicon is observed to remain on the surface of the graphite.

The graphite crucible prepared by the process of Example V was used to evaporate silicon onto the surface of a glass substrate suspended in a vacuum apparatus of the type shown in FIG. 1. The silicon was heated to a temperature of from about 1500° C. to about 1700° C. The graphite strip crucible or molten silicon retainer, did not fracture, nor did the molten silicon leak through the graphite. An even depth of silicon was observed to have been deposited on the substrate.

Although the invention has been disclosed and described in detail, the same is by way of example only and is not to be taken by way of limitation, the spirit and scope of this invention being limited only by the terms of the appended claims.

I claim:
1. A process for treating a graphite part comprising the steps of
   (1) coating the surface with silicon;
   (2) heating the coated graphite part until the silicon is melted and absorbed by the graphite to form a treated graphite part with a silicon impregnated surface;
   (3) cooling said treated part to a temperature below the melting point of silicon, and
   thereafter repeating the cycle of steps (1), (2) and (3) until no further silicon is absorbed by the graphite.
2. The process of claim 1 wherein the amounts of silicon employed in successive cycles are sufficient upon heating to penetrate into the graphite to a depth of from about 0.01 to about 0.3 millimeter below the surface of the graphite.
3. The process of claim 1 wherein said heating is carried out in an atmosphere which is substantially non-reactive towards silicon or graphite.
4. The process of claim 3 wherein said heating is carried out at a reduced pressure.
5. A process for making a crucible for holding molten silicon comprising
   (1) providing a graphite part having a depression in its surface,
   (2) placing silicon powder in said depression,
   (3) heating said graphite and silicon until said silicon becomes molten and is absorbed by said graphite, to form a treated graphite part with a silicon-impregnated surface portion,
   (4) cooling said treated graphite part to a temperature below the melting point of silicon, and thereafter
   repeating the cycle of steps (2) through (4) until no further silicon is absorbed by the graphite.
6. The process of claim 5 wherein
   the amounts of silicon powder placed in said depression in successive cycles are sufficient upon heating to penetrate to a depth of from about 0.01 to about 0.3 mm. below the surface of the graphite part.
7. The process of claim 5 wherein
   the amounts of silicon powder placed in said depression in successive cycles are sufficient upon heating to penetrate to a depth of from about 0.01 to about 0.3 mm. below the surface of the graphite part, and repeating the cycle of steps (2) through (4) until no additional silicon is absorbed by the graphite part.
8. A silicon-containing graphite part produced by the process of claim 1.
9. A silicon-containing graphite crucible produced by the process of claim 5.
10. A silicon-containing graphite crucible produced by the process of claim 7.

References Cited by the Examiner

UNITED STATES PATENTS

| | | | |
|---|---|---|---|
| 2,962,386 | 11/60 | Doll et al. | 117—228 XR |
| 2,992,127 | 7/61 | Jones | 117—228 |
| 3,140,193 | 7/64 | Kane | 117—8 |

FOREIGN PATENTS 538,342   3/57   Canada.

WILLIAM D. MARTIN, *Primary Examiner.*

RICHARD D. NEVIUS, M. KATZ, *Examiners.*